(No Model.)
F. W. STEVENS.
HOSE NOZZLE.
No. 574,585. Patented Jan. 5, 1897.
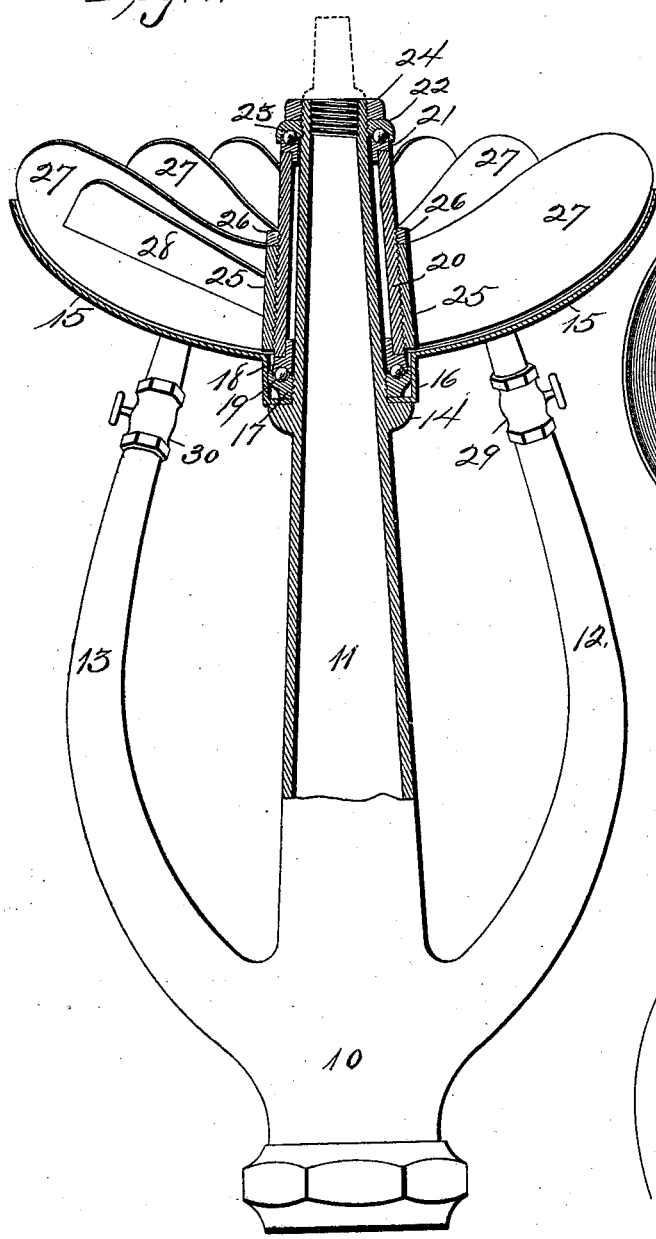
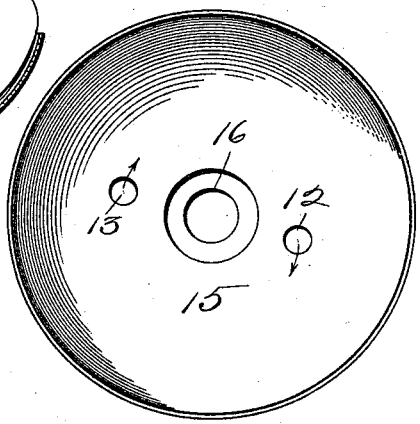
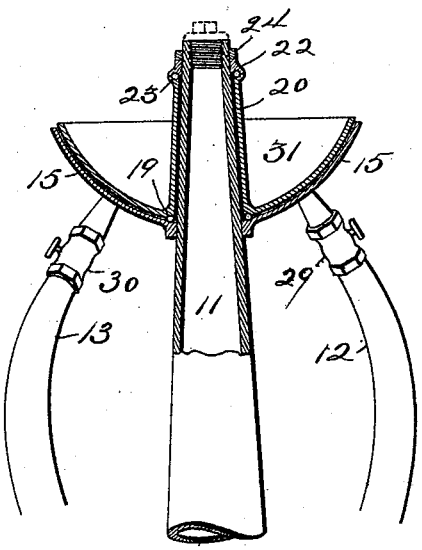
Witnesses: W. J. Sankey, Reuben G. Orwig
Inventor: Frank W. Stevens, By Thomas G. Orwig, Attorney

UNITED STATES PATENT OFFICE.

FRANK W. STEVENS, OF LAKE VIEW, IOWA.

HOSE-NOZZLE.

SPECIFICATION forming part of Letters Patent No. 574,585, dated January 5, 1897.

Application filed March 7, 1896. Serial No. 582,255. (No model.)

*To all whom it may concern:*

Be it known that I, FRANK W. STEVENS, a citizen of the United States of America, and a resident of Lake View, in the county of Sac and State of Iowa, have invented a new and useful Hose-Nozzle, of which the following is a specification.

The object of this invention is to provide improved means for throwing a spray of water or a straight solid stream or a combination of a solid stream and a spray.

My invention consists in the construction, arrangement, and combination of elements hereinafter set forth, pointed out in my claims, and illustrated by the accompanying drawings, in which—

Figure 1 is an elevation, partly in section, of the preferred form of the complete device. Fig. 2 is a plan of the bowl. Fig. 3 is an elevation, partly in section, of a modified form of the device.

In the construction of the device as shown in Figs. 1 and 2 the numeral 10 designates the stem of the nozzle, which is provided with a main way or pipe 11 and branch ways or handle-pipes 12 13, the pipes 12 13 diverging from the stem 10 and leading upwardly and inwardly toward the upper end portion of the pipe 11. The pipe 11 converges toward its extremity and is internally screw-threaded at its outer end to receive a plug or smaller mouthpiece, as shown by dotted lines in Fig. 1. A shoulder 14 is formed integrally on the exterior of the stem or pipe 11 adjacent to the plane at the ends of the pipes 12 13. A bowl 15, saucer-shaped and provided with a central annular depressed portion 16, is provided, which bowl is centrally apertured to permit the passage of the pipe 11 therethrough until the shoulder 14 contacts therewith. The bowl 15 is of such diameter as to extend beyond the pipes 12 13 a distance greater than the space between said pipes and the main pipe 11. A raceway 17 is screwed upon the exterior of the pipe 11 and contacted with the depressed portion of the bowl to confine said bowl in contact with the shoulder 14. A raceway 18 is loosely mounted on the pipe 11 and approximates to the raceway 17, being separated from the raceway 17 by balls 19. A hub 20 is fixed to the raceway 18 and extends upwardly along the pipe 11 to a point of attachment to a raceway 21, which is loosely mounted on the pipe and approximates to a raceway or cone 22, which cone 22 is screw-threaded upon the pipe and separated from the raceway 21 by balls 23. The cone 22 is retained on the pipe by a lock-nut 24. A spray-wheel 25 is screw-threaded and screwed upon the exterior of the hub 20 and is held in position by a lock-nut 26, mounted on said hub. The spray-wheel conforms to the contour of the bowl 15 with a plurality of radial wings 27, each of which wings is provided with an inclined deflector or blade 28 on one side to receive the impact of streams of water and assist in the spraying thereof. The extremities of the pipes 12 13 communicate with apertures in the bowl 15. The pipes 12 13 extend torsionally or in spiral lines from the points of branching to the points of communication with the bowl, or, in other words, considering Fig. 1 as an elevation, the pipe 13 extends rearwardly relative to the pipe 11 and the pipe 12 extends forwardly relative to the pipe 11, as indicated by the perspectives of the valve-chambers thereon and the arrows in Fig. 2. Valves 29 30 are mounted in the pipes 12 13, whereby the flow of water through said pipes may be regulated or cut off.

In the operation of the device shown in Figs. 1 and 2, if it be desired to throw a spray and straight stream, the plug is removed from the mouth of the pipe 11, the valves 29 30 are opened, and the water turned on, at which time the water flowing through the pipe 11 will form a straight solid stream and the water flowing through the pipes 12 13 will strike the blades of the spray-wheel at a tangent and impact with the deflectors 28, thereby revolving the spray-wheel and deflecting, scattering, and spraying the water into a fine solid sheet. A smaller spray may be thrown by partially closing either one or both of the valves 29 30, or either of said valves may be entirely closed.

When it is desired to throw a half-spray or a spray on one side only of the axis of the jet-nozzle, one or the other of the valves 29 30, as required, may be shut off, and in that event the other valve will permit the flow of water through the branch pipe or passage and against the spray-wheel.

A spray only may be thrown by inserting the plug in the mouth of the pipe 11.

In the construction of the ball-bearing between the pipe 11 and the spray-wheel provision is made for the light and easy running of said wheel at great velocity and without noise.

In the construction of the device as shown in Fig. 3 the spray-wheel and its hub are omitted and a concavo-convex spraying-plate 31 is mounted rigidly upon the pipe 11 within and in juxtaposition to the bowl 15. In the operation of this device the water flows through the pipes 12 13 tangential to the plate 31 and is discharged from said plate and the bowl in a fine sheet.

I claim as my invention—

1. A hose-nozzle, comprising a three-way stem, a bowl of materially greater diameter than the nozzle communicating with two of said ways independent of the central way, a spray-wheel of a diameter coincident with the diameter of the bowl mounted upon the other way and arranged within the bowl in the path of the water from the first said ways, wings on said spray-wheel and arranged to receive the impact of the water from the said two ways, and a ball-bearing interposed between said spray-wheel and the central nozzle.

2. A hose-nozzle, comprising three connecting nozzles, a bowl communicating with two of the said nozzles, a spray-wheel mounted on the other nozzle and arranged within the bowl in the path of the flow of water from the first said nozzles, and means for controlling the flow of water from the nozzles.

3. In a hose-nozzle, the combination of a stem or central nozzle, a ball-bearing cone mounted on said nozzle and resting against a shoulder 14 thereon, a traveling cone mounted in opposition to the first said cone and separated therefrom for the insertion of balls 19, a hub rigidly mounted upon the said traveling cone, wings mounted on said hub and radiating therefrom, deflecting-plates mounted on the wings, a traveling cone 21 mounted on the end of the hub opposite to the first said traveling cone, a stationary cone in opposition to the cone 21 and separated therefrom for the insertion of balls 23 therein, and a jam-nut 24 whereby the stationary cone is held in proximity to the traveling cone 21.

4. In a hose-nozzle, a central or jet nozzle, a hub mounted thereon, blades radially mounted on the said hub and extending at oblique angles to the axis of the nozzle, deflecting-plates 28 mounted on the central portions of one side of the blades and having their longitudinal planes at oblique angles to the axis of the nozzle, a bowl rigidly mounted on the central nozzle and conforming in contour to the lower edges of the blades, and branch nozzles 12, 13 arranged peripherally of the central nozzle and communicating with the blades through the bowl, which branch nozzles are arranged helically relative to the axis of the central nozzle.

FRANK W. STEVENS.

Witnesses:
W. P. CRAFT,
WM. WADE.